United States Patent [19]

Harder

[11] 4,296,741

[45] Oct. 27, 1981

[54] SOLAR ENERGY COLLECTING PANEL ASSEMBLY

[75] Inventor: Willard J. Harder, Minneapolis, Minn.

[73] Assignee: Bethany Fellowship, Inc., Minneapolis, Minn.

[21] Appl. No.: 15,313

[22] Filed: Feb. 26, 1979

[51] Int. Cl.³ .............................................. F24J 3/02
[52] U.S. Cl. ................................... 126/449; 126/429; 126/446; 126/450
[58] Field of Search ............... 126/417, 428, 429, 432, 126/446, 447, 449, 450, 901

[56] References Cited

U.S. PATENT DOCUMENTS

| D. 243,246 | 2/1977 | England | D26/1 R |
|---|---|---|---|
| D. 243,248 | 2/1977 | England | D26/1 R |
| 2,944,138 | 7/1960 | Goff | 219/34 |
| 2,987,300 | 6/1961 | Greene | 165/168 |
| 3,448,798 | 6/1969 | Coe | 165/168 |
| 3,894,685 | 7/1975 | Keyes et al. | 126/429 |
| 3,946,720 | 3/1976 | Keyes et al. | 126/418 |
| 3,946,721 | 3/1976 | Keyes et al. | 126/436 |
| 3,946,944 | 3/1976 | Keyes et al. | 126/452 |
| 3,980,071 | 9/1976 | Barber, Jr. | 126/447 |
| 3,982,527 | 9/1976 | Cheng et al. | 126/438 |
| 3,987,786 | 10/1976 | Keyes et al. | 126/449 |
| 3,995,615 | 12/1976 | Hojnowski | 126/444 |
| 4,003,364 | 1/1977 | Balkus, Jr. | 126/438 |
| 4,007,729 | 2/1977 | Choo et al. | 126/439 |
| 4,010,080 | 3/1977 | Tsay et al. | 126/451 |
| 4,016,861 | 4/1977 | Taylor | 126/436 |
| 4,019,494 | 4/1977 | Safdari | 126/449 |
| 4,019,496 | 4/1977 | Cummings | 126/441 |
| 4,046,135 | 9/1977 | Root et al. | 126/441 |
| 4,060,070 | 11/1977 | Harter | 126/447 |
| 4,064,868 | 12/1977 | Nussbaum | 126/446 |
| 4,068,652 | 1/1978 | Worthington | 126/425 |
| 4,073,282 | 2/1978 | Schriefer, Jr. | 126/441 |
| 4,076,013 | 2/1978 | Bette | 126/430 |
| 4,079,724 | 3/1978 | Zwillinger | 126/439 |
| 4,085,728 | 4/1978 | Tomchak | 126/445 |
| 4,127,103 | 11/1978 | Klank et al. | 126/432 |
| 4,144,874 | 3/1979 | Zebuhr | 126/450 |
| 4,148,294 | 4/1979 | Scherber et al. | 126/901 |
| 4,197,830 | 4/1980 | Wilson | 126/430 |
| 4,201,196 | 5/1980 | Zani | 126/450 |
| 4,204,522 | 5/1980 | Wilson | 126/447 |

FOREIGN PATENT DOCUMENTS

| 2509422 | 9/1976 | Fed. Rep. of Germany | 126/446 |
|---|---|---|---|
| 2522154 | 11/1976 | Fed. Rep. of Germany | 126/446 |

Primary Examiner—Larry Jones
Attorney, Agent, or Firm—Burd, Bartz & Gutenkauf

[57] ABSTRACT

A solar energy collector having panel assemblies for absorbing solar energy and transferring heat to moving air. Each panel assembly has a heat insulated housing carrying a plurality of side-by-side solar energy collector units. Each unit has a base plate carrying upwardly directed longitudinal ribs providing solar energy collector surfaces and downwardly directed longitudinal fins providing heat dissipating surfaces. A longitudinal foot along one side of the plate supports the collector unit on insulating material located within the housing. A coating tongue and groove structure supports the opposite side of the plate on the adjacent collector unit. A light transparent sheet member mounted on the housing covers the collector units and forms therewith a dead air chamber. Air is moved through longitudinal passages between adjacent feet with air moving apparatus whereby heat is transferred to the air moving along the fins. In one embodiment of the collector unit, pipes carrying liquid are mounted between adjacent fins whereby heat is transferred from the base plate and fins to the liquid flowing in the pipes.

22 Claims, 7 Drawing Figures

U.S. Patent Oct. 27, 1981 Sheet 1 of 3 4,296,741
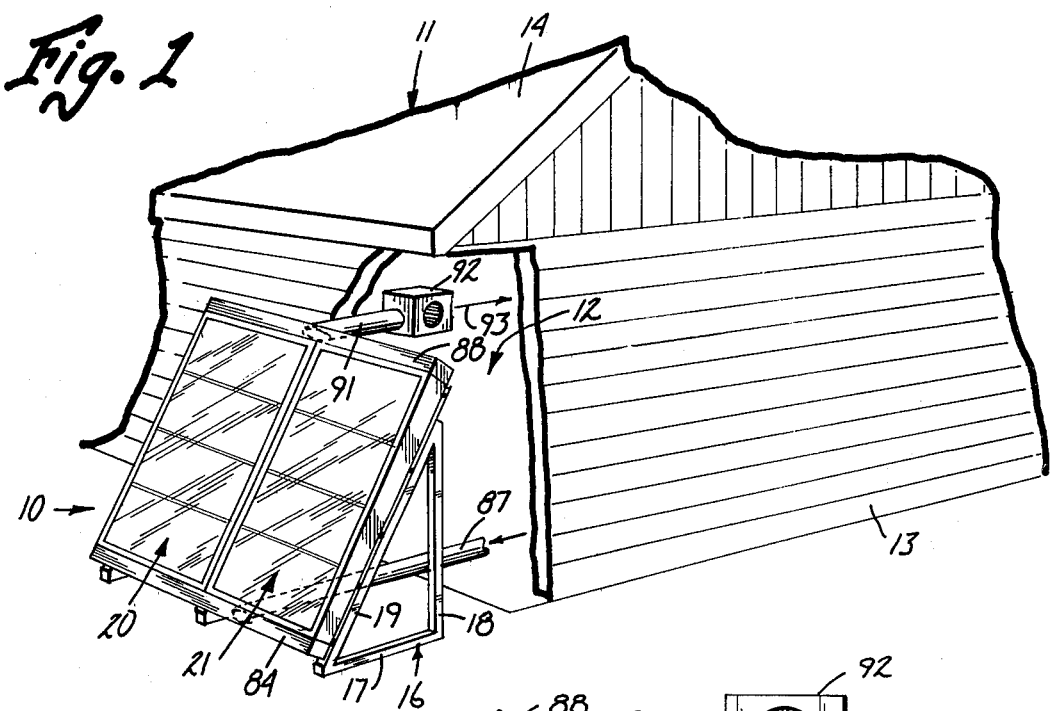
Fig. 1
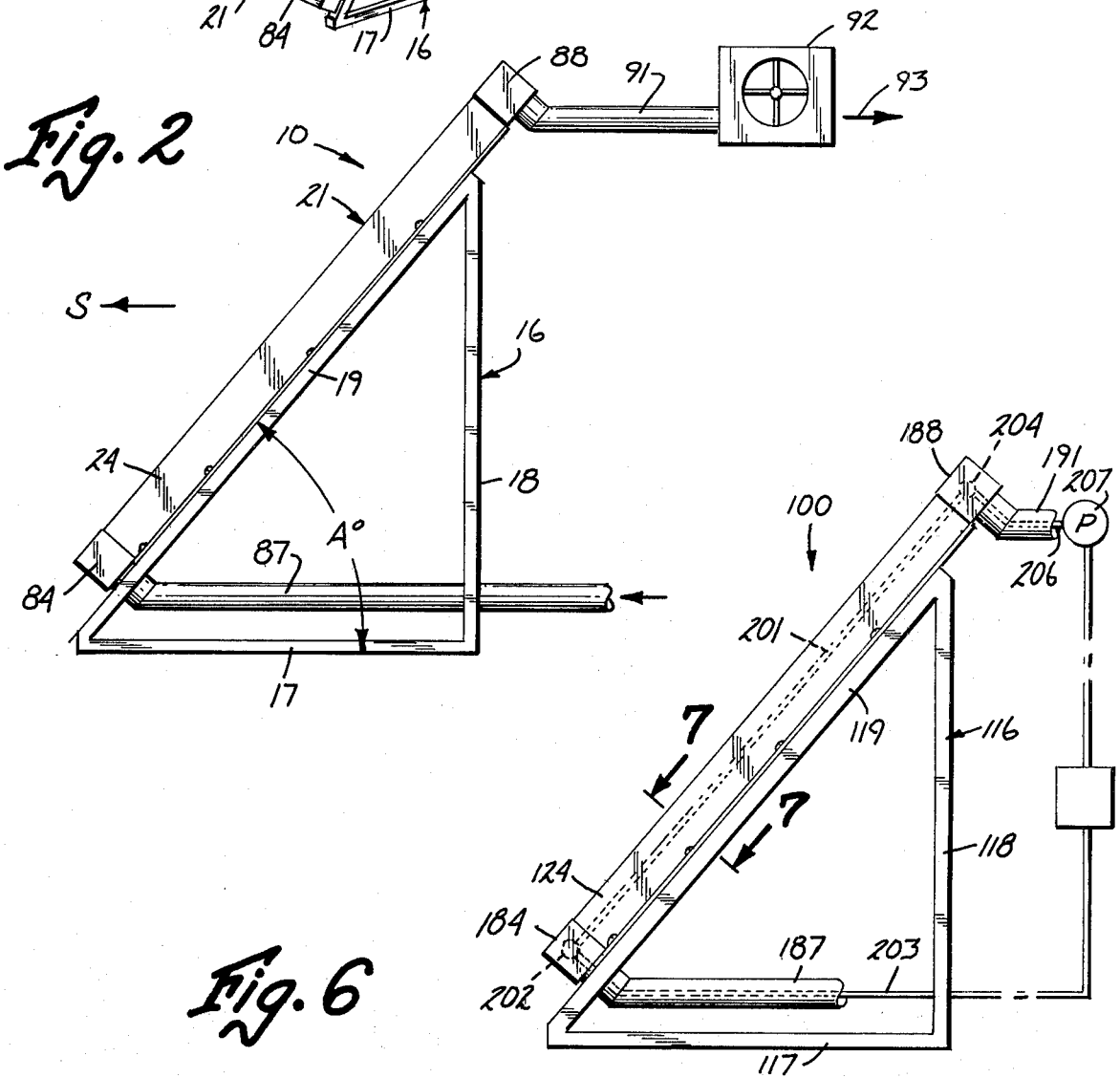
Fig. 2
Fig. 6

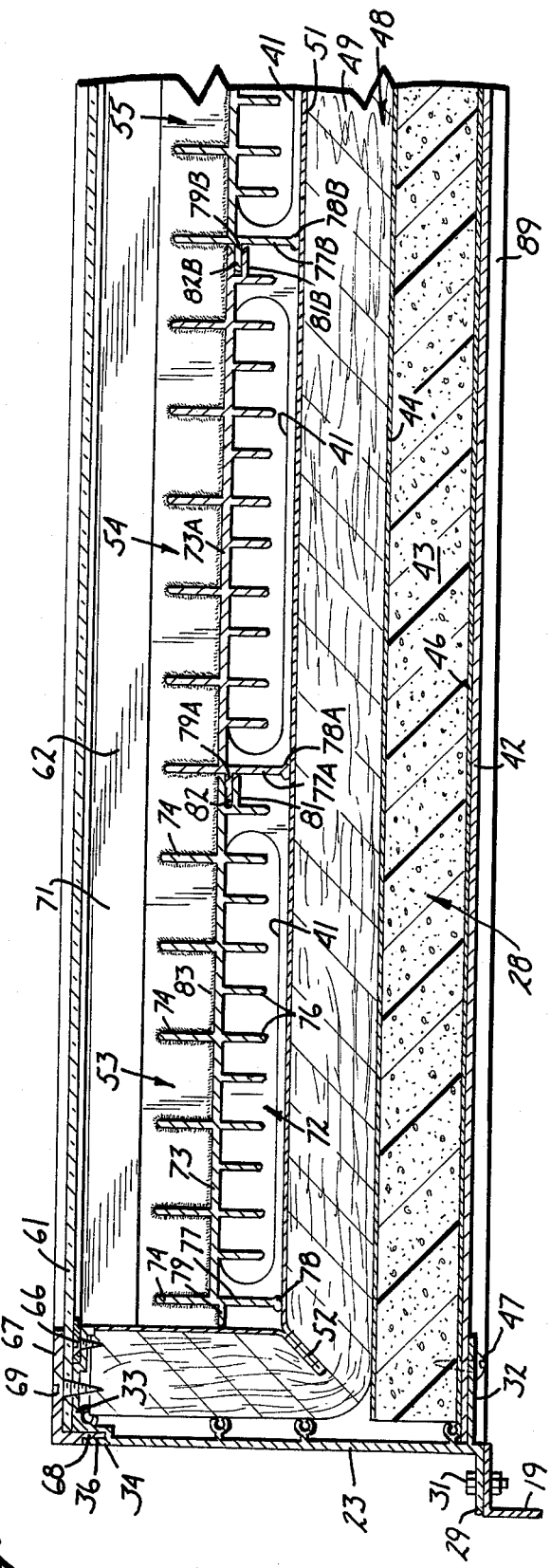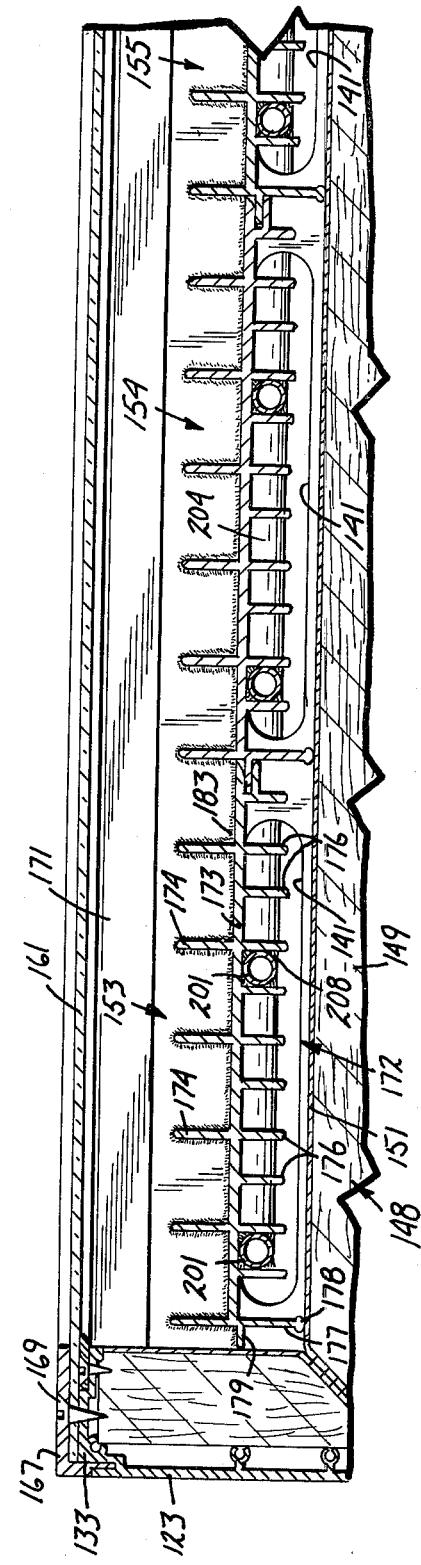

SOLAR ENERGY COLLECTING PANEL ASSEMBLY

SUMMARY OF INVENTION

The invention is directed to an apparatus for heating a fluid, as a liquid or gas, with solar energy and transferring the heated fluid to a desired location. More specifically, the invention relates to a solar energy collecting panel assembly having a housing carrying heat insulating means. A plurality of solar energy collector units are located within the housing and are enclosed therein with a light transparent sheet means. Each solar energy collector unit has a base plate supporting a plurality of longitudinal ribs projected from the plate toward the cover and a plurality of heat dissipating fins projected from the plate toward the insulating means. The fins are spaced from the insulating means with a single support foot located along one side of the plate. Means along the other side of the plate support the collector unit on an adjacent collector unit. Gas, as air, is supplied to heat transferring passages through an inlet manifold attached to one end of the housing. The hot gas flows from the housing into an outlet manifold attached to the opposite end of the housing. A gas moving means is used to cause gas to continuously flow through the housing.

In one embodiment of the collector unit, pipes or tubes are interposed between selected adjacent fins. A liquid pumped through the tubes carries heat from the tubes to a desired location, as a hot water heater or hot water radiator. This collector unit also transfers heat to gas flowing in the passages adjacent the base plate and fins. The solar energy collecting panel assembly is efficient in operation and durable in use. The housing and collector units are strong, yet light in weight. The panel assembly is versatile in use as it has adaptable numerous installations and can be used to heat both gas and liquid. These and other advantages of the solar energy collector panel assembly are embodied in the following detailed description of the invention and the drawings.

IN THE DRAWINGS

FIG. 1 is a perspective view of the solar energy collector of the invention located adjacent a structure for receiving hot air from the collector;

FIG. 2 is an enlarged side view of the collector of FIG. 1;

FIG. 5 is an enlarged sectional view taken along the line 5—5 of FIG. 3;

FIG. 6 is a side elevational view similar to FIG. 2 of a modification of the solar energy collector of the invention; and FIG. 7 is an enlarged sectional view taken along the line 7—7 of FIG. 6.

DESCRIPTION OF PREFERRED EMBODIMENTS

Figures 3, 4:
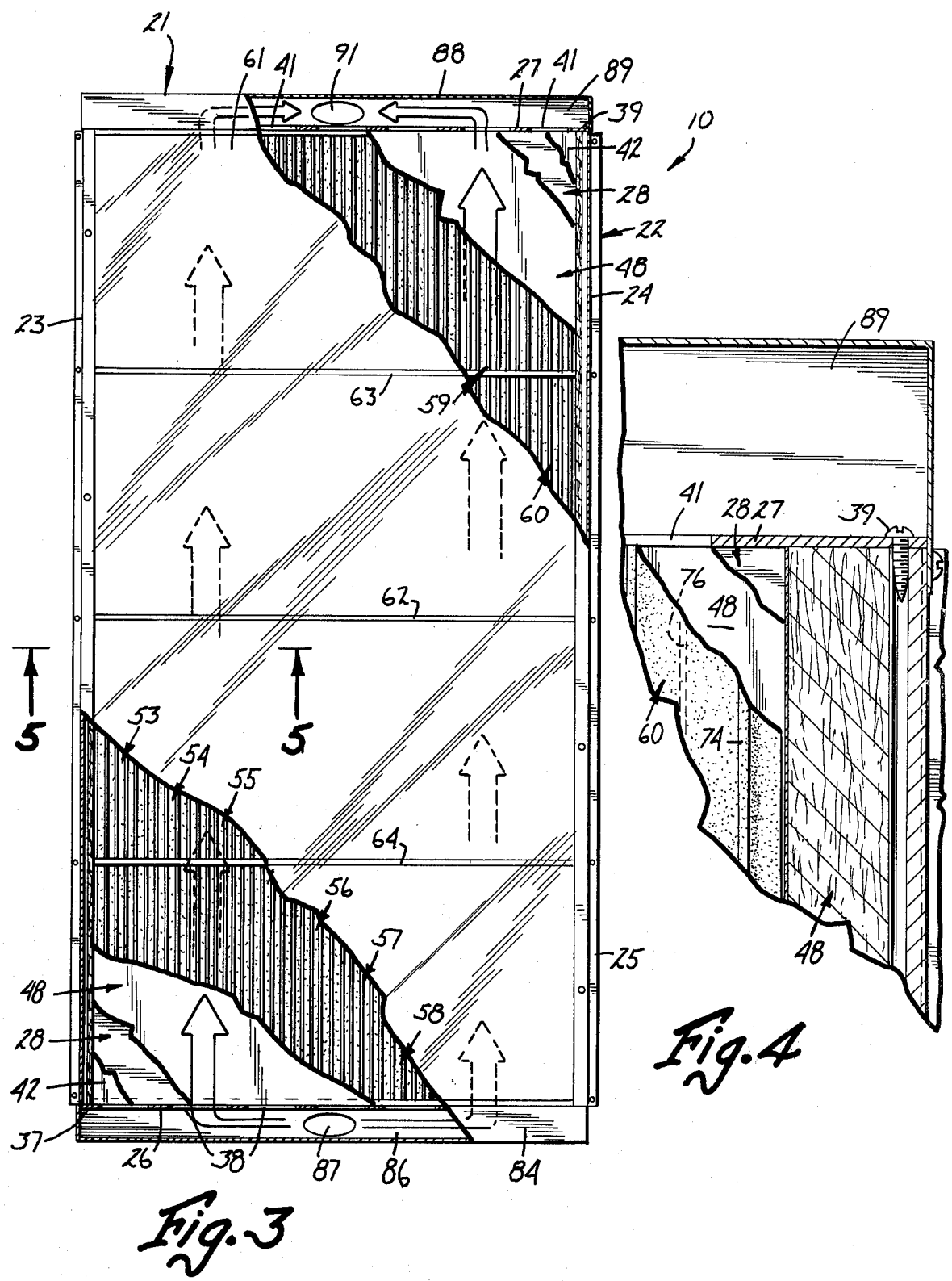
FIG. 3 is an enlarged top plan view with parts broken away of a solar energy panel of the collector of FIG. 1.
FIG. 4 is an enlarged sectional view of the upper right hand corner of the collector panel of FIG. 3.

Referring to FIG. 1, there is shown a solar energy collector 10 located adjacent a structure 11, such as a home, garage, greenhouse, office, industrial building, and the like. Collector 10 is a hot air collector usable for space heating an enclosed area or room 12. Structure 11 has upright side walls 13 and roof 14 surrounding room 12. Structure 11 can be any suitable means desired to be heated with hot air. The hot air from collector 10 can be used to dry material, as grain. Collector 10 is usable to heat gases other than air.

Collector 10 has a supporting framework indicated generally at 16. Framework 16 has a plurality of horizontal base members 17 connected to upright posts 18. Base members 17 can be attached to a support of the ground. Hypotenuse members 19 are secured to the upper ends of posts 18 and the forward ends of base members 17. A pair of panel assemblies indicated generally at 20 and 21 are mounted on framework 16. Panel assemblies 20 and 21 are located in side-by-side relation and are inclined at an angle A, as shown in FIG. 2. Angle A is preferably 55°. Other angles can be used to provide for maximum of solar energy collection efficiency. The angle of the panel assemblies will vary in accordance with the North-South location of the solar energy collector installation. The energy collector 10 is shown with a pair of panel assemblies. Additional panel assemblies can be aligned with the panel assemblies 20 and 21. The number of panel assemblies is determined in accordance with the energy requirements of structure 11. Panel assemblies 20 and 21 are identical in structure and function. The following description is limited to panel assembly 21.

Referring to FIG. 3, panel assembly 21 has a box-shaped housing indicated generally at 22 secured to hypotenuse members 19 of framework 16. Housing 22 has longitudinal side members 23 and 24 and transverse end members 26 and 27 connected to opposite ends of side members 23 and 24. The bottom of housing 22 is closed with a bottom wall or panel 28. As shown in FIG. 5, side member 23 has a lower outwardly directed flange 29 secured to hypotenuse member 19 with a nut and bolt assembly 31. Side member 24 has a similar outwardly directed flange 25 attached to another hypotenuse member. Side member 23 has an inwardly directed bottom flange 32 supporting bottom panel 28. Fasteners 47, such as screws, attach bottom panel 28 to flange 32. Side member 24 has a similar flange attached to the opposite side of bottom panel 28. The upper end of side member 23 has an inwardly directed top flange 33 and an upwardly directed longitudinal lip 34. Lip 34 forms with flange 33 a longitudinal slot or groove 36, the function of which is hereinafter described.

Returning to FIG. 3, end member 26 has a plurality of inlet openings 38 which allow air to flow through housing 22. Screws 37 secure opposite ends of end member 26 to side members 23 and 24. Outlet end member 27 is attached to the ends of side members 23 and 24 with screws 39. Member 27 has a plurality of outlet openings 41 which permit heated air to flow from housing 22. Screws 37 and 39 are turned into C-shaped projections integral with side members 23 and 24.

Referring to FIG. 5, bottom wall 28 is a laminated heat insulating structure having an outer sheet metal member 42, such as sheet aluminum. A heat insulating core 43 is located on member 42. Metal foil or sheet members 44 and 46 are secured to opposite sides of core 43. A suitable adhesive is used to bond foil 46 to sheet member 42. Core 43 is a nonflammable expanded foam plastic. Other types of heat insulating material can be used in bottom wall 28.

A heat insulating blanket indicated generally at 48 covers bottom wall 28 and extends upwardly to the top flanges 33 of side members 23 and 24. Blanket 48 has a core 49 of heat insulation material, as a glass fiber mat, and a covering of metal foil 51, as aluminum foil. Blanket 48 is a one-sheet member that is bent at its corners 52 to cover the entire bottom wall 28 and the inside surfaces of side walls 23 and 24.

A plurality of side-by-side solar energy collector units or plate means indicated generally at 53, 54, 55, 56, 57, 58, 59, and 60 are located on blanket 48 between the sides thereof. The solar energy collector plate means 53–60 have an upper heat energy collector surface which functions to absorb heat from sun and a heat dissipating surface which transmits heat to a heat transferring fluid, such as air, or like gas. The heated air moves through housing 22 into room 12.

The top of housing 22 is closed with a cover 61. The cover 61 can be glass fiber reinforced plastic, glass or other sheet material that has high light transmission characteristics. A plurality of longitudinally spaced transverse supports 62, 63, and 64 extend between side members 23 and 24 to support cover 61. As shown in FIG. 5, fasteners, such as screw 66, attach support 62 to top flange 33 of side member 23. A similar fastener attaches the opposite end of support 62 to side wall 24. Supports 62, 63, and 64 are right angle structural members. The outer peripheral edges of cover 61 are attached to flange 33 with a longitudinal strip 67. Strip 67 has a longitudinal downwardly directed tongue 68 that fits into groove 36. A plurality of fasteners 69, such as screws, attach strip 67 to flange 33. A sealant and bonding material is interposed between strip 67 and cover 61 to seal the outer peripheral edge of cover 61 to strip 67 to prevent water and foreign matter from entering the chambers 71 and 72 containing collector plate means 53–60.

Returning to FIG. 5, the side-by-side solar energy collector plate means 63–60 divides the chambers between the blanket 48 and cover 61 into a longitudinal upper chamber 71 and a plurality of longitudinal lower chambers 72. Each solar collector plate means 53–60 forms a lower passage or chamber 72 for carrying air through the housing. Each of lower passages 72 are aligned with an inlet opening 38 and an outlet opening 41. The upper chamber 71 is enclosed to provide dead air space.

Returning to FIG. 5, solar energy collector units or plate means 53–60 are identical in structure. The following description is directed to plate means 53. Solar energy collector plate means 53 has a generally horizontal base plate 73 integral with a plurality of upwardly directed longitudinal ribs 74 and downwardly directed heat dissipating fins 76. Ribs 74 are laterally spaced and are parallel to each other and extend the length of plate 73. Fins 76 extend downwardly toward foil 51 of blanket 48. The lower ends of the fins are spaced from foil 51. Fins 76 are parallel and laterally spaced from each other and extend the length of base plate 73. A fin is in vertical alignment with each of ribs 74. Ribs 74 have a height of 1.5 cm and are spaced from each other a distance of 2.3 cm. The height of each rib 74 is less than the lateral distance between adjacent ribs. Six ribs 74 are on plate 73 which has a length of 15 cm. Fins 76 have a height of 1.2 cm and are spaced from each other a distance of 1 cm. The height of the fins 76 is greater than the lateral distance between adjacent fins. Twelve fins 76 extend downwardly from base plate 73. There are twice as many fins 76 as ribs 74. The heat dissipating surface of fins 76 and bottom of base plate 73 is greater than the solar energy collecting surface of ribs 74 and the top of base plate 73. Base plate 73, ribs 74 and fins 76 have about the same thickness and are made from heat conductive metal, as aluminum. The entire plate means 53 is a one-piece metal unit, preferably an aluminum extrusion. The plate 73, ribs 74 and fins 76 can be relatively thin light weight heat conductive material because the perpendicular or normal orientation of ribs 74 and fins 76 strengthen plate 73. Other sizes, numbers and dimensions of plate 73, ribs 74 and fins 76 can be used for the structure of plate means 53.

A longitudinal downwardly directed flange or foot 77 is secured to the left end of base plate 73. Foot 77 terminates in a longitudinal bead or shoe 78 that engages foil 51 to support the one side of solar collector plate means 53 on blanket 48. A longitudinally extended lateral projection or tongue 79 integral with the upper portion of foot 77 contracts an upright portion of blanket 48 to space outside ribs 74 from the adjacent part of blanket 48.

The opposite or inner end of base plate 73 has an outwardly directed lip or flange 81 that forms with the side of plate 73 a groove 82 to accommodate a tongue 79A of the adjacent solar collector plate means 54. Groove 82 has a lateral or side open mouth and extends the full length of base plate 73. Tongue 79A extends into groove 82 to support the right side collector plate means 53 on the left side of collector plate means 54. Foot 78A supports the left side of collector plate means 54 on blanket 48.

Solar collector plate means 54–60 are identical to the solar collector plate means 53. identical parts are identified with the same reference numerals having the suffixes A, B, C, D–G. Tongue 79A and groove 82 in conjunction with lip 81 serve as a cooperating holding structure for the right side of solar collector means 53. This cooperating structure insures that the feet 77, 77A 77B–G are the only structure that supports the solar collector plate means 53–60 on blanket 48. Feet 77, 77A–G locate fins 76 above top foil 51 of blanket 48 to prevent conduction of heat from fins 76 to blanket 48. Feet 77, 77A–G also serve as longitudinal baffles separating the space between blanket 48 and base plates 73, 73A–G, into separate longitudinal channels which carry air from inlet manifold 84 to outlet manifold 88.

The outer surfaces of ribs 74 and the top of base plate 73 are covered with a coating 83 of solar energy absorbent material. The material can be a black fiber-like substance that increases the effective surface area of ribs 74 and top of base plate 73. The material can be a black velvet solar coating sold under the trade name NEXTEL by the 3M Company of St. Paul, Minn. Other types of solar energy coating materials can be used on ribs 74 and base plate 73.

A transverse inlet manifold 84 is attached to the inlet end of housing 22. As shown in FIG. 3, inlet manifold 84 has a transverse chamber 86 in communication with inlet openings 38 and the opening in an air inlet pipe 87. Air inlet pipe 87 is open to the room 12 so that a supply of air can flow through inlet pipe 87, manifold chamber 86, and the lower chambers 72.

An outlet manifold 88 is attached to the outlet or upper end of housing 22. Outlet manifold 88, as shown in FIG. 3, has a transverse chamber 89 in communication with outlet openings 41 and an outlet passage of an outlet pipe 91. As shown in FIGS. 1 and 2, outlet pipe 91 connects manifold 88 to an air moving means 92, as a motor operated blower. The blower 92 functions to continuously draw air through the lower chambers 72 and discharge the air into room 12. Inlet and outlet manifolds 84 and 88 extend across both panel assemblies 20 and 21 whereby blower 92 functions to simultaneously draw air through the panel assemblies. Other types of air moving means can be used to provide a flow of air through lower chambers 72.

In use, panel assemblies 20 and 21 are mounted on the frame 16 with the covers 61 orientated in the direction of the sun. In the northern hemisphere, panel assemblies 20 and 21 face the south and are located at an angle with respect to the surface of the ground. The angle varies with the location of collector 10.

Air moving means 92 operates to draw air through the collector assemblies 20 and 21. The air is withdrawn from room 12 through intake pipe 87. The air is distributed to the panel assemblies through chamber 86 of inlet manifold 84. The air moves through inlet openings 38 and into the longitudinal lower passages 72 below the solar energy collector plate means 53-60. Fins 76 project into passages 72 and function as heat dissipating members which transfer the heat energy from base plate 73 and ribs 74 to the air flowing in passages 72. The hot air flows from chamber 72 via outlet opening 41 into the outlet manifold chamber 89. Pipe 91 carries the hot air to blower 92, which discharges hot air 93 into room 12. The air can be discharged into a hot air duct system of a structure or into a conventional hot air furnace which distributes the hot air throughout the structure. Other types of hot air distribution means can be used to facilitate the utility of the hot air discharge by air moving means 92.

Referring to FIGS. 6 and 7, there is shown a modification of the solar energy collector of the invention indicated generally at 100. The solar energy collector is identical in structure. The like parts have the same reference numeral with the prefix 1.

Collector 100 is a combined liquid and hot air collector. The hot air structure is identical to panel assembly 21. As shown in FIG. 7, a plurality of tubular members or pipes 201 are located between adjacent pairs of fins 176 and in engagement with the bottom of base plate 173. Heat conducting material 208, as a heat conducting caulking, secures pipe 201 to base plate 173 and fins 176. Pipe 201 can be copper tubing located in a tight fit relationship between adjacent fins 176. Pipe 201 is preferably located in engagement with fins 176 that are in alignment with a rib 174. Fins 176 can be crimped inwardly over pipe 201 at intervals to insure that pipe 201 stays between adjacent fins 176. Each solar collector plate means 153-160 has preferably two copper pipes 201, as shown in FIG. 5. Additional copper pipes can be added to plate means 153-160.

As shown in FIG. 6, pipes 201 are connected to a transverse inlet header pipe 202 located within manifold 184. An inlet tube or pipe 203 is connected to header pipe 202. Pipe 203 is located within inlet air duct 187.

The upper ends of pipes 201 are connected with a transverse header pipe 204 located within outlet manifold 188. A liquid discharge pipe 206 is connected to header pipe 204 and a pump 207. The pump 207 is operable to circulate liquids, such as a mixture of water and anti-freeze, through pipes 201-206. Discharge pipe 206 extends through air discharge duct 191. The hot liquid discharged by the pump can be directed to a heat transfer tank 207 used to store a supply of hot water. The storage tank can be connected to the inlet pipe 203 to provide a liquid circulating system. The heat collected by base plate 173 and ribs 174 is transferred to the liquid carried by pipes 201. The liquid moving through pipes 201 flows to the storage tank. The system continues to operate so long as the pump moves the liquid through the pipes 201-206.

Solar energy collector 100 continues to operate as a hot air collector. The solar energy is transferred in the form of heat through the base plate 173 and ribs 174 to the fins 176. The air in the chambers 172 is heated. As the air moves through the chambers 173 the heat is carried to a desired location, such as room 12.

While there has been shown and described preferred embodiments of the solar energy collecting pad assembly and collector unit, it is understood that changes in the materials, structures, components and structure sizes and relationships can be made by those skilled in the art without departing from the invention. The invention is defined in the following claims.

The embodiments of the invention in which an exclusive property or privilege is claimed are defined as follows:

1. A solar energy collector unit comprising: an elongated generally flat plate having a first side, a second side, a first side edge, and a second side edge, a plurality of ribs secured to and projected away from the first side of the plate, said ribs extended in the longitudinal direction of the plate and disposed generally parallel to each other and having substantially the same height, a plurality of fins secured to and projected away from the second side of the plate, said fins extended in the longitudinal direction of the plate and disposed generally parallel to each other, each rib is a flat continuous rib member, said rib members being laterally spaced from each other a distance greater than the height of a rib, each fin is a flat continuous fin member, each of said rib members being in longitudinal alignment with a fin member, a longitudinal single foot secured to and projected away from the second side of the plate, said foot having a height greater than the height of the fins, first means on the first side edge of the plate adapted to be connected to a first adjacent collector unit, said first means comprising a flange extended generally parallel with said plate and spaced therefrom forming a longitudinal groove extended in a direction generally parallel to the plate, and second means on the second side edge of the collector unit adapted to be connected to a second adjacent collector unit, said second means comprising a tongue projected laterally away from the plate and extended in a direction generally parallel to the plate, said tongue adapted to fit into a longitudinal groove of the second adjacent collector unit.

2. The collector unit of claim 1 wherein: each fin has substantially the same height, and the lateral distance between adjacent fins is less than the height of the fins.

3. The collector unit of claim 1 wherein: the number of fins is about twice the number of ribs.

4. The collector unit of claim 1 wherein: a first fin is located in the plane of each rib, and a second fin is located between each adjacent first fin.

5. The collector unit of claim 4 including: tube means for carrying a liquid secured to at least one first fin and a second fin.

6. The collector unit of claim 1 wherein: the foot is a generally flat continuous foot member, and an enlarged bead on the outer end of the foot member.

7. The collector unit of claim 1 wherein: the entire unit is a one-piece heat conductive metal member.

8. The collector unit of claim 1 including: means for carrying a liquid located adjacent at least one fin.

9. The collector unit of claim 8 wherein: the means for carrying a liquid cooomprise tubes secured to at least one fin.

10. A solar energy collecting panel assembly comprising: a housing having side members and a bottom wall attached to the side members, said side members and bottom wall having inside surfaces, heat insulating means located adjacent the inside surfaces of the side members and bottom wall, sheet means attached to the side members and spaced from the bottom wall, said sheet means being made of material that allows solar energy to pass through the sheet means, a plurality of solar energy collector means located between the insulating means and sheet means to absorb energy from the sun and transmit heat energy to a gas, each collector means having a generally flat plate extended along the longitudinal length of the housing, a plurality of ribs projected from the plate toward the sheet means, said ribs extended linearly along the longitudinal length of the plate with adjacent ribs being laterally spaced from each other, a plurality of fins projected from the plate toward the insulating means covering the bottom wall, said fins extended linearly along the length of the plate with adjacent fins being laterally spaced from each other, said fins being spaced from said insulating means, said fins, plate and insulating means providing longitudinal passages extended along the length of the collector means, each of said ribs being longitudinally aligned with a fin, a single support foot along one side edge of the plate engaging the insulating means providing the sole support of the one side of the collector means on the insulating means and the single support foot of the adjacent collector means providing the sole support of the other side of the collector means, a single tongue located along said one side edge of the plate and projected laterally therefrom in a direction generally parallel to the plate, said tongue of a first collector means spacing said first collector means and ribs thereon from the insulating means, a flange extended generally parallel with said plate and spaced from the other side edge of the plate forming a longitudinal groove extended in a direction generally parallel to the plate adapted to accommodate a tongue of a second adjacent collector means whereby said tongue and support foot of the second adjacent collector means supports said other side of the plate, a gas inlet manifold attached to the housing, said gas inlet manifold having a gas inlet chamber and opening means connecting the chamber with all the longitudinal passages for directing gas into all the longitudinal passages between the plate, adjacent fins and insulating means, and a gas outlet manifold attached to the housing, said gas outlet manifold having a gas outlet chamber and opening means connecting the gas outlet chamber with all the longitudinal passages for receiving hot gas from all of said longitudinal passages.

11. The panel assembly of claim 1 including: gas moving means connected to the gas outlet manifold operable to move gas through the passage whereby heat energy is transferred from the fins and plate to the gas and removed from the collector means.

12. The panel assembly of claim 1 wherein: each rib is a continuous longitudinal rib located in alignment with a fin.

13. The panel assembly of claim 12 wherein: said collector means has more fins than ribs.

14. The panel assembly of claim 10 wherein: each rib has substantially the same height, and the lateral distance between the adjacent ribs is greater than the height of the ribs.

15. The panel assembly of claim 10 wherein: each fin has substantially the same height, and the lateral distance between adjacent fins is less than the weight of the fins.

16. The panel assembly of claim 10 wherein: the number of fins is about twice the number of ribs.

17. The panel assembly of claim 10 wherein: a first fin is located in the plane of each rib, a second fin is located between each adjacent first fins.

18. The panel assembly of claim 10 including: means for carrying a liquid secured to at least one fin.

19. The panel assembly of claim 10 including: tube means for carrying a liquid, said tube means being located between adjacent fins, one of said fins secured to the tube means being located in a plane of a rib.

20. The panel assembly of claim 10 wherein: the ribs are generally flat continuous rib members.

21. The panel assembly of claim 10 wherein: the fins are generally flat continuous fin members.

22. The panel assembly of claim 10 including: an elongated enlarged bead on the portion of the foot engaging the insulating means.

* * * * *